(No Model.)

C. F. HARDER.
FEED TROUGH.

No. 400,080. Patented Mar. 26, 1889.

Witnesses

Inventor
Christian F. Harder,
By Wm H Lotz
Atty.

UNITED STATES PATENT OFFICE.

CHRISTIAN F. HARDER, OF CHICAGO, ILLINOIS.

FEED-TROUGH.

SPECIFICATION forming part of Letters Patent No. 400,080, dated March 26, 1889.

Application filed January 2, 1889. Serial No. 295,236. (No model.)

*To all whom it may concern:*

Be it known that I, CHRISTIAN F. HARDER, a citizen of the United States of America, residing at Chicago, in the county of Cook and State of Illinois, have invented certain new and useful Improvements in Feed-Trough Attachments to Wagon-Poles, of which the following is a specification, reference being had therein to the accompanying drawings.

This my invention relates to devices for the temporary attachment of a feed-trough to the tongue of a vehicle, so horses can be conveniently fed on the road or without being unhitched, at the same time preventing a dispersion of the oats or other food; and it has been my object to provide a trough made of flexible material that can be readily folded in a small compass, to occupy but a very small space in the wagon for carrying it along, and that is easily attached to the wagon-pole in an expanded position; and with these objects in view my invention consists of the novel devices and combinations of devices hereinafter described and specifically claimed.

Figure 1:
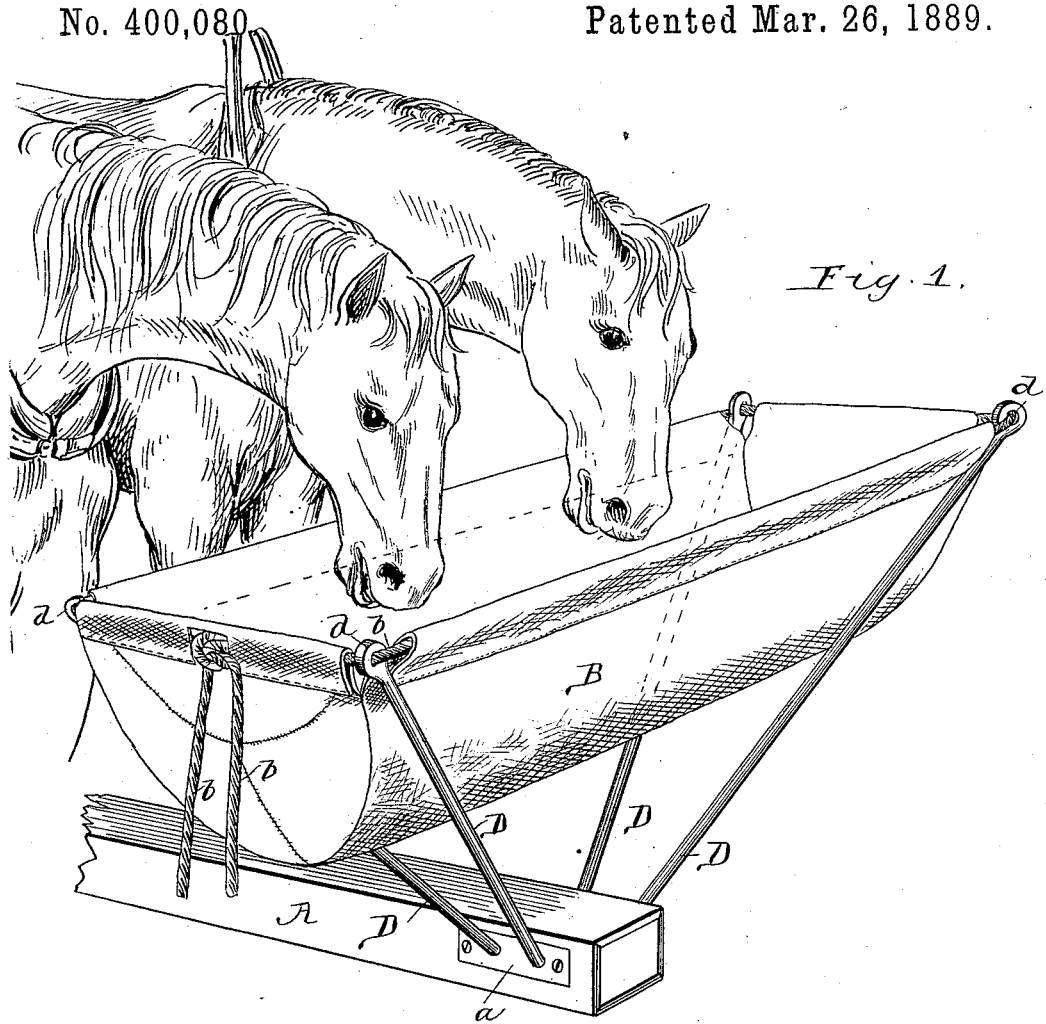
Figure 2:
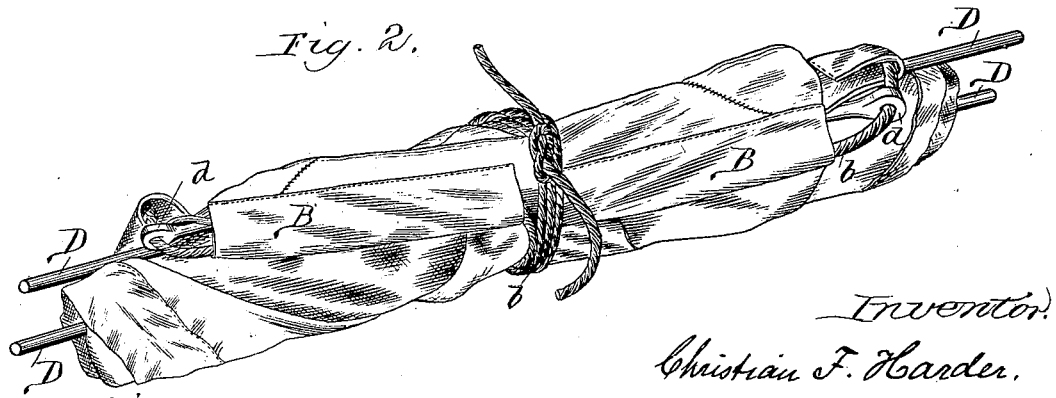

In the accompanying drawings, Figure 1 represents a perspective view of the trough as attached to a vehicle-tongue, and Fig. 2 the same as folded to be placed in the wagon-box.

Corresponding letters of reference in the several figures of the drawings designate like parts.

A denotes the end of the vehicle-tongue, into the sides of which are mortised and rigidly secured by bolts iron plates *a*, each provided with two holes or sockets of downwardly-inclined and longitudinally-deviating angular direction.

B is the trough, made of canvas or other flexible material, the sides and ends of which are hemmed on top around a rope, *b*, which, being exposed at the corners of the trough, is there passed through eyes *d* of round iron rods D, which, with their lower ends, are inserted into the holes or sockets of plates *a* of wagon-pole A, to be on a flaring position that will stretch the trough B at its four corners to be on a level. At one end of the trough B an opening is provided for the ends of rope *b* to protrude, which by stretching and tying will contract the eyed ends of the rods D, and thereby will clamp the lower ends of these rods to afford a rigid hold in their sockets. These socket-plates *a* may be fixed either to the front or rear or middle of the tongue, in which latter case the horses will have to be unhitched and reversed for reaching the trough. At any time after the horses have been fed, and before starting off the vehicle again, the rope *b* is untied and slackened, when the rods D can be readily withdrawn from their sockets, the flexible trough B folded with or around the rods D, and the whole tied together with the ends of rope *b*, similar to that shown by Fig. 2, to form a small handle that will occupy little space in the wagon-box or below the driver's seat.

What I claim is—

1. As an attachment to a vehicle-tongue having sockets, four standards removably inserted in these sockets on relative flaring positions, and having eyed upper ends holding the four corners of a flexible trough by means of a rope hemmed into the upper edges thereof and passed through the eyes of the standards, all substantially as set forth.

2. As an attachment to a vehicle-tongue having sockets, four standards removably inserted in these sockets on relative flaring positions, and having eyed upper ends holding the four corners of a flexible trough by means of a rope hemmed into the upper edges thereof and passed through the eyes of the standards, with the ends of the rope protruding from the hems to enable contracting and tying, all substantially as set forth.

In testimony whereof I affix my signature in presence of two witnesses.

CHRISTIAN F. HARDER.

Witnesses:
 WILLIAM H. LOTZ,
 OTTO LUBKERT.